Dec. 11, 1962

R. B. STRONG 3,067,722

ANIMAL FEEDER

Filed Jan. 13, 1960

INVENTOR.
RAYMOND BUNN STRONG

BY Shanley & O'Neil

ATTORNEYS

INVENTOR.
RAYMOND BUNN STRONG
BY Shanley & O'Neil
ATTORNEYS

United States Patent Office 3,067,722
Patented Dec. 11, 1962

3,067,722
ANIMAL FEEDER
Raymond Bunn Strong, Memphis, Tenn., assignor to National Pressed Steel Roofing Company, a firm
Filed Jan. 13, 1960, Ser. No. 2,285
3 Claims. (Cl. 119—53.5)

The invention relates to animal feeders and more particularly to an improved animal feeder having a feeding trough which can be readily removed and replaced.

Most subject to wear in the average feeder is the feeding trough. This section of the feeder takes the greatest amount of physical abuse from the animals being fed, is subjected to chemical reaction with the saliva of the animals, and, because of its position, is generally most exposed to the elements. Due to these factors, the feeding trough is normally in need of replacement long before the remainder of the feeder.

Formerly, when the trough needed replacement, the entire feeder had to be replaced. Prefabricated metallic feeders offered no solution to this problem as the feeder was normally damaged beyond repair in attempting to dismantle the feeding trough. Though uneconomical in itself, replacement of the entire feeder proved more economical in time and labor to the experienced user.

Continuous self-feeders are demanding in other ways when the teachings of modern animal husbandry are followed. The feeding place is a serious disease spreader. Diseased animals can be readily isolated but decontaminating the feeding place is a time-consuming job. The entire feeder may need to be destroyed or, at best, is put out of use until sterilization can be completed. With the improved feeder of the invention, the contaminated portion of the feeder can be replaced immediately on location and sterilization effected at leisure.

An object of the invention is to provide an improved animal feeder in which the feeding trough can be readily and economically replaced.

Another object of the invention is to provide an articulated animal feeder which is simple to assemble and operate.

Another object of the invention is the provision of an animal feeder in which the available feed is easily regulated.

Another object of the invention is the provision of an animal feeder in which the replacement feeding trough is self supporting during and after installation.

Other advantageous functions and objects of the invention will become obvious to those experienced in animal husbandry during the ensuing description.

The invention, in its broader aspects, contemplates an articulated animal feeder having feed supply means communicating with feeding trough means. The feeding trough may be readily removed from or slipped into feed-tight relationship with the feed supply from a convenient postion exterior to the feeder, without benefit of special tools or handling equipment, and without disturbing the feed supply means or awkward maneuvering beneath or around the feeder. Structural support is provided between the feed supply means and the feeding trough means, as necessary, dependent upon the environment and the animals being fed.

Normal farm functions, such as pasture or pen feeding of cattle, pigs, sheep, etc., can be readily carried out by the teachings of the invention and the invention will be described in this environment. When so employed, after the feeder is loaded, animals can maintain themselves unattended because of the self-operating features of the feeder embodying the invention.

Figure 1:
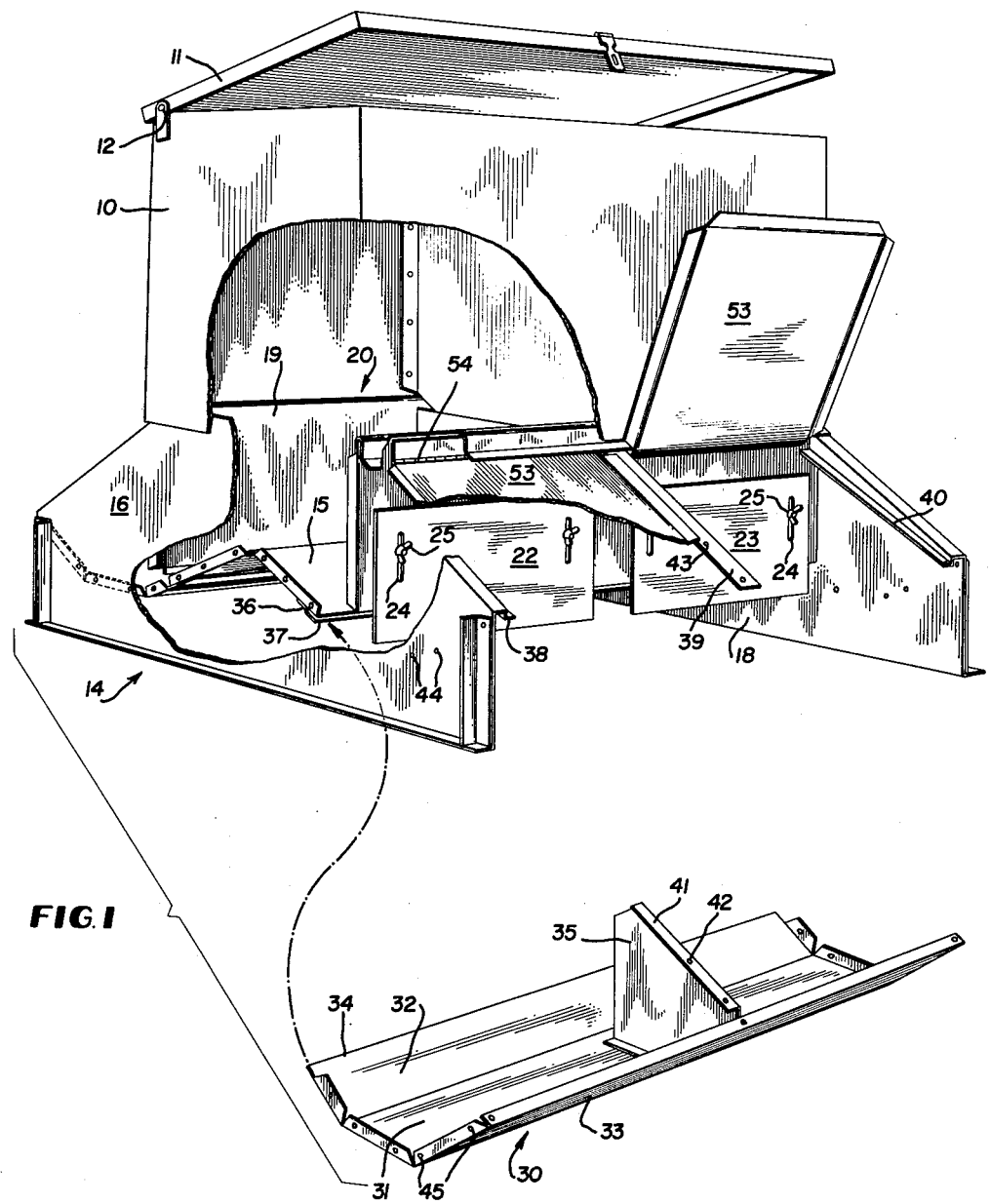
FIG. 1 is an exploded view cut away of an animal feeder embodying the invention.
Figure 4:
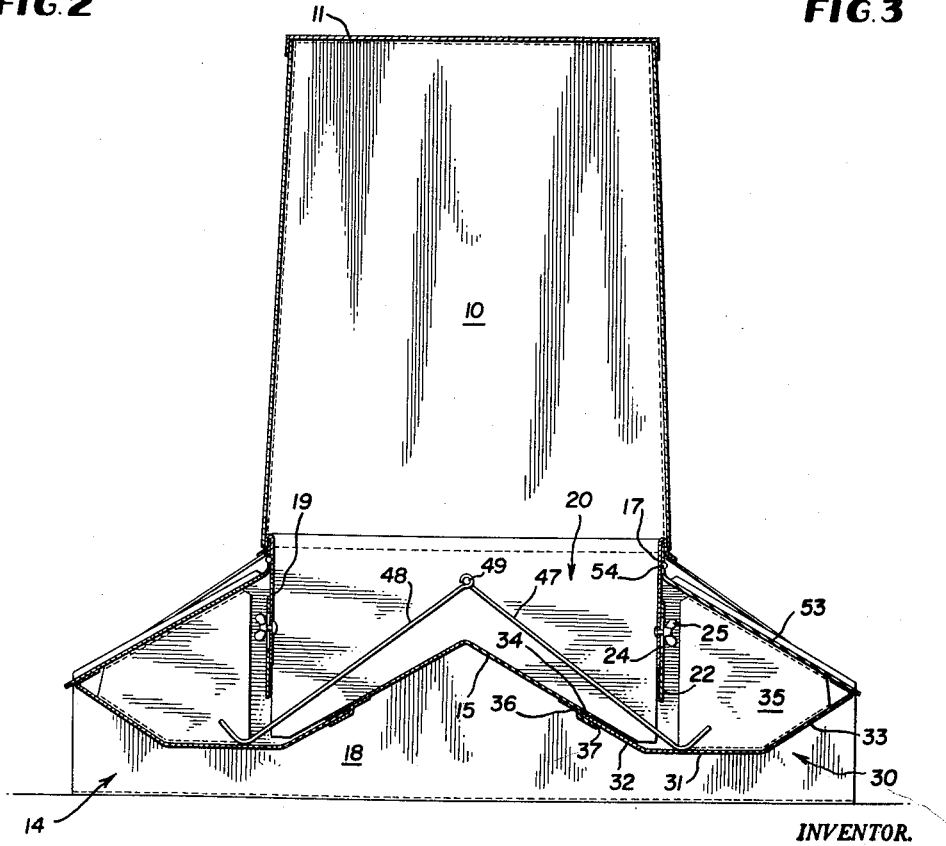
FIG. 4 is a cross-sectional view of the animal feeder of FIG. 1 in assembled form.

Referring in particular to FIGURES 1 and 4, the feed supply means is in the form of a demountable hopper 10 which has a roof 11 hinged at 12. The hopper 10 is mounted on support base 14. An inverted V floor 15 is affixed to the support base 14 and forms part of a feed passageway which is further defined by the side 16 (shown partially cut away) and the wall 17. Opposite to side 16 and wall 17 are side 18 and wall 19 respectively. The floor 15, sides 16, 18, and walls 17, 19 act as feed-directing means and form a feed chute 20 which is in feed-receiving relationship to hopper 10.

Gates 22 and 23 are attached to and form an extension of wall 17. These gates are adjustable vertically by such means as elongated slot 24 and lock nut 25. Adjustable gates of like character are mounted on wall 19 (not shown in FIGURE 1). The adjustable gates can be positioned to control feed flow and adjusted vertically to control the feed flow from the hopper 10 through the feed chute 20.

In FIGURE 1, feeding trough 30 is shown removed from the main body of the feeder. Trough 30 includes a bottom 31 and sides 32 and 33 which constitute the feed-holding compartment of the trough. Formed along side 32 is a male extension member 34 which is coextensive with the longitudinal dimension of the feed-holding compartment. A separator 35 divides the trough 30 into feeding stations.

In accordance with the objects of the invention, feeding trough 30 may be readily slid into place to complete the feeder. Portions of the main body of the feeder and the feeding trough cooperate to accomplish this object. Near the feed discharge area of chute 20, floor 15 has joined to it elongated sheet metal member 36 which forms the slot or channel member 37. The support base 14 includes support arms such as 38, 39, and 40 extending in the direction of the feeding troughs. An angle iron 41 is joined to the upper portion of the separator 35. When the feeding trough is placed into position on the main body of the feeder, its weight is supported by the support arm 39 via angle iron 41; simultaneously, the male extension member 34 fits snugly into slot 37; a feed-tight joint is formed between the feed chute 20 and the feeding trough 30 and the trough is supported in working position.

Alignment and securing means may be provided between the support arm 39 and the angle iron 41 such as apertures 42 and 43. Additional securing means, at the feeding trough ends, may be provided including apertures in the side 16 and trough 30, such as 44 and 45, respectively. However, other adaptations are available, for example, support at arms 38 and 39 with structure similar to that of separator 35 and angle iron 41.

Dependent on the type of animal being fed and the disposition of the feeder, gravity alone may not be sufficient to make feed continuously available to the animals. To circumvent this problem, the invention includes feed agitators 47 and 48 as shown in FIGURE 4. Structurally, the agitators may take the form of heavy metal rods which are vibrated by the animal while feeding. The rods extend into the feed-holding compartment from within the feed supply means and have a squared U configuration when viewed from the animal feeding position. Each feeding station may be provided with a separate agitator, with the lower portion extending across the feeding station and the upper ends of the rods being pivotally connected to support structure 49 within the feed supply means.

Figure 3:
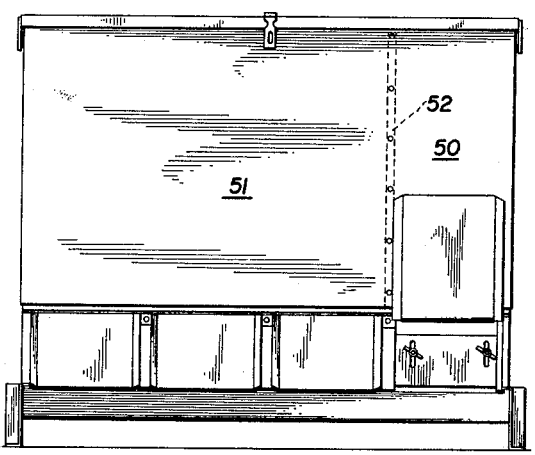
FIG. 3 is a front view of an animal feeder embodying the invention.

FIGURE 3 illustrates another feature of the invention. A partition 52 fitted crosswise in demountable hopper 10 affords a means of supplying more than one kind of feed into the feed trough 30. Partition 52 is installed between a single feeding station feeder 50 and a plural feeding station feeder 51. Partition means may be positioned between any number of feeding stations to provide the desired ratio or blend of differing feed types.

A feeding trough cover, such as 53, is provided for each feeding station. Cover 53 is hinged to the support structure at 54. The feeding trough covers are adapted for opening by the animal and resting on the animal's head during feeding. As a result, the feed is, to a large degree, protected from the elements at all times.

Figure 2:
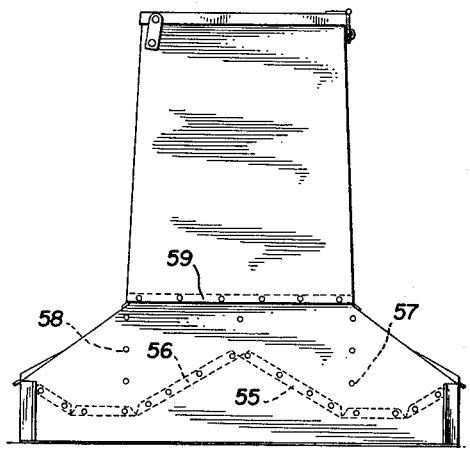
FIG. 2 is a side view of an animal feeder embodying the invention.

In the side view of the animal feeder of FIG. 2, means are shown diagrammatically for attaching the hopper and chute wall and floor means to a support base. The feeder may be assembled by the user by securing the floor means to the support base at 55 and 56, the wall means to the support base at 57 and 58, and the hopper to the support base at 59.

The feeder is preferably fabricated from sheet metal. The feeding trough, since it is separate, may be made from heavier gauge metal or corrosion-resistant metal and the life of the feeder is thereby materially increased. While the feeders illustrated have been generally rectilinear in configuration, the teachings of the invention are equally applicable to curvilinear structures.

It is to be understood that the form of the invention, herewith shown and described, is to be taken as a preferred example of the same, and that various changes in the shape, size and arrangement of parts may be resorted to without departing from the spirit of the invention or the scope of the subjoined claims.

What is claimed is:

1. An articulated self-supporting animal feeder for ground level feeding of cattle, pigs, sheep and the like comprising a support base; a feed hopper; a feed chute in feed-receiving relationship to the hopper including feed-directing wall and floor means and channel forming means joined to and coextensive with an edge of the floor means, the wall means including adjustable gate means for controlling the flow of feed through the chute; an elongated detachable feeding trough including a feed-holding compartment, separator means dividing the feed-holding compartment into feeding stations, and a male extension member longitudinally coextensive with the feeding compartment; and support structure means for securing the feeding trough to the base support including a support arm in trough supporting relationship with the separator means.

2. The feeder of claim 1 further including movable feeding trough cover means attached to the support structure means.

3. The feeder of claim 2 further including feed agitator means extending from the feed chute into the feed-holding compartment.

References Cited in the file of this patent

UNITED STATES PATENTS

| | | |
|---|---|---|
| 1,334,075 | Borton | Mar. 16, 1920 |
| 1,463,862 | Wolf | Aug. 7, 1923 |
| 1,881,820 | McCollough et al. | Oct. 11, 1932 |
| 2,746,423 | Runion | May 22, 1956 |